United States Patent
Nishi et al.

(10) Patent No.: US 9,802,155 B2
(45) Date of Patent: Oct. 31, 2017

(54) METHOD FOR PURIFYING EXHAUST GAS

(71) Applicant: Hitachi Zosen Corporation, Osaka-shi (JP)

(72) Inventors: Tsugumi Nishi, Osaka (JP); Naoe Hino, Osaka (JP); Seigo Yamamoto, Osaka (JP); Susumu Hikazudani, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 14/907,962

(22) PCT Filed: Jul. 18, 2014

(86) PCT No.: PCT/JP2014/069127
§ 371 (c)(1),
(2) Date: Jan. 27, 2016

(87) PCT Pub. No.: WO2015/012202
PCT Pub. Date: Jan. 29, 2015

(65) Prior Publication Data
US 2016/0166989 A1     Jun. 16, 2016

(30) Foreign Application Priority Data
Jul. 25, 2013 (JP) ................................. 2013-154752

(51) Int. Cl.
*B01D 53/56* (2006.01)
*B01D 53/94* (2006.01)
(Continued)

(52) U.S. Cl.
CPC ..... *B01D 53/9418* (2013.01); *B01D 53/8631* (2013.01); *B01J 29/46* (2013.01);
(Continued)

(58) Field of Classification Search
CPC .. B01D 53/56; B01D 53/565; B01D 53/9409; B01D 53/9418; B01D 2257/402;
(Continued)

(56) References Cited

U.S. PATENT DOCUMENTS 5,041,272 A * 8/1991 Tamura .............. B01D 53/9418
423/212
5,562,884 A * 10/1996 Oakes .................... B01D 53/56
110/245
(Continued)

FOREIGN PATENT DOCUMENTS

DE    19581123 T1 * 10/1996 ......... B01D 53/9409
EP    2213371 A1    8/2010
(Continued)

OTHER PUBLICATIONS

International Search Report dated Oct. 28, 2014, issued for PCT/JP2014/069127.

*Primary Examiner* — Timothy Vanoy
(74) *Attorney, Agent, or Firm* — Locke Lord LLP

(57) ABSTRACT

The present invention provide a method for purifying exhaust gas in which nitrogen oxides (NOx) gas is removed from a combustion exhaust gas. The method for purifying exhaust gas according to the invention is characterized in that water vapor is further added to raw exhaust gas to be processed to increase the water vapor concentration in the exhaust gas and the resulting moisture-adjusted exhaust gas is introduced into a denitration catalyst layer. The water vapor concentration in the moisture-adjusted exhaust gas is preferably 22.0% by volume or less in the total of the water vapor originally contained in the raw exhaust gas and the added water vapor.

13 Claims, 2 Drawing Sheets

(51) Int. Cl.
- *F01N 3/20* (2006.01)
- *B01J 29/46* (2006.01)
- *B01D 53/86* (2006.01)
- *F01N 3/10* (2006.01)
- *F01N 13/00* (2010.01)
- *F01N 3/04* (2006.01)
- *F01N 3/00* (2006.01)

(52) U.S. Cl.
CPC ............... *F01N 3/04* (2013.01); *F01N 3/108* (2013.01); *F01N 3/206* (2013.01); *F01N 3/2066* (2013.01); *F01N 13/004* (2013.01); B01D 2251/21 (2013.01); B01D 2255/20746 (2013.01); B01D 2255/504 (2013.01); B01D 2258/012 (2013.01); B01D 2259/4566 (2013.01); F01N 3/005 (2013.01); F01N 2570/14 (2013.01); F01N 2590/02 (2013.01); F01N 2610/03 (2013.01); F01N 2610/06 (2013.01); F01N 2610/14 (2013.01); Y02T 10/24 (2013.01)

(58) Field of Classification Search
CPC ........ B01D 2257/404; B01D 2258/012; F01N 3/206; F01N 3/2066; F01N 2270/14; F01N 2590/02
See application file for complete search history.

(56) References Cited

U.S. PATENT DOCUMENTS

| | | | | |
|---|---|---|---|---|
| 6,395,238 | B1* | 5/2002 | Rogers | B01D 53/32 422/186.04 |
| 7,608,226 | B2* | 10/2009 | Rocha | B01D 53/9409 422/168 |
| 2007/0009412 | A1* | 1/2007 | Rocha | B01D 53/9409 423/239.1 |
| 2008/0041037 | A1* | 2/2008 | Kass | B01D 53/9409 60/286 |
| 2017/0001181 | A1* | 1/2017 | Yoshida | B01D 53/9418 |

FOREIGN PATENT DOCUMENTS

| | | | |
|---|---|---|---|
| JP | 02233124 A * | 9/1990 | ............ B01D 53/36 |
| JP | 04-358525 A | 12/1992 | |
| JP | 06-047255 A | 2/1994 | |
| JP | 10-028840 A | 2/1998 | |
| JP | 2004-358454 A | 12/2004 | |
| JP | 2006-220107 A | 8/2006 | |
| JP | 2013-059721 A | 4/2013 | |
| JP | 2013-091045 A | 5/2013 | |
| WO | WO-2009/057650 A1 | 5/2009 | |

* cited by examiner

METHOD FOR PURIFYING EXHAUST GAS

TECHNICAL FIELD

The present invention relates to a method for purifying exhaust gas in which nitrogen oxides (NOx) are removed from combustion exhaust gas of, for example, a marine diesel engine or other internal combustion engines.

BACKGROUND ART

When nitrogen oxides in combustion exhaust gas of an internal combustion engine such as a marine engine is removed, an ammonia selecting reduction method is mainly adopted as a method therefor. The ammonia selecting reduction method is a method in which a denitration catalyst containing vanadium or titanium as a main component is used as a catalyst and ammonia is used as a reducing agent.

However, when a C fuel oil or the like is combusted in an internal combustion engine such as a marine engine, since sulfur components are contained in the C fuel oil or the like, sulfur oxides will also be generated in the combustion exhaust gas along with nitrogen oxides. For such combustion exhaust gas, when denitration is carried out using an ammonia selecting reduction method, sulfur oxides and ammonia are reacted in combustion exhaust gas to give ammonium sulfate [$(NH_4)_2SO_4$], which deposits in facilities once the temperature of the combustion exhaust gas is lowered, resulting in clogging in a heat exchanger or other problems. For this reason, there has been a problem in that the temperature in the system has to be set to a temperature within the range where ammonium sulfate does not deposit (about 280° C. or higher).

On the other hand, as a reductive removal method using a reducing agent other than ammonia, for example, PTL 1 as listed below discloses a method in which an alcohol is used as a reducing agent along with a catalyst of a metal supported on a zeolite.

However, there has been a problem in that, when an alcohol is brought into contact with a catalyst of a metal supported on a zeolite, a side reaction also occurs besides the desired reaction and so-called coke (carbon) deposits on a surface of the catalyst due to a by-product produced by such a side reaction, resulting in deterioration of the denitration performance with time.

PTL 2 discloses that a deteriorated denitration performance is recovered by placing a denitration catalyst layer in two-divided exhaust gas processing channels, closing one of the exhaust gas processing channels to stop supply of the exhaust gas while continuing to process the exhaust gas in another exhaust gas processing channel, and heating in situ the denitration catalyst layer of the one exhaust processing channel in which the supply of the exhaust gas is stopped at 350 to 800° C.

PTL 3 discloses a reductive removal method of nitrogen oxides by bringing a metal aluminate catalyst containing a transition metal of the fourth period into contact with exhaust gas containing nitrogen oxides under an oxidizing atmosphere where an excess amount of oxygen is present and in the presence of alcohol.

On the other hand, PTL 4 discloses a removal method of nitrogen oxides by bringing one or more catalysts selected from a proton type zeolite, an alumina, and an alumina supporting a transition metal of the fourth period into contact with exhaust gas containing nitrogen oxides in an oxidizing atmosphere where an excess amount of oxygen and water vapor are present and in the presence of at least one of methanol and ethanol at a reaction temperature of 200 to 550° C.

CITATION LIST

Patent Literature

PTL 1: JP-A-2004-358454
PTL 2: JP-A-2006-220107
PTL 3: JP-A-4-358525
PTL 4: JP-A-6-47255

SUMMARY OF INVENTION

Technical Problem

However, according to the methods of the related art described in PTLs 1 to 4, there has been a problem in that the deterioration in performance of a denitration catalyst due to deposition of coke on the surface of the denitration catalyst caused by a side reaction of the alcohol can not be sufficiently suppressed, and hence the long term durability of the denitration catalyst can not be sufficiently enhanced.

Furthermore, for applying the denitration system in which an alcohol is used as a reducing agent to a marine engine, further enhancement in the performance is demanded. There has also been a problem in that, in loading an alcohol on a ship, for example, ethanol, whose flash point is equal to or lower than 60° C., has to be handled as a hazardous material under the regulations for the carriage and storage of dangerous goods in ship, and it is required to make a measure such as using double pipes, leading to an increase in cost of denitration facilities.

An object of the present invention is to solve the above problems in the related art to provide a highly practical method for purifying exhaust gas in which: when an alcohol is used as a reducing agent, not only by using water contained in the exhaust gas but also by further adding water, a denitration performance of a denitration catalyst can be expected to be enhance and durability of the denitration catalyst can be sufficiently enhanced; and by using an alcohol aqueous solution in a lowered concentration as a method for increasing the water content which contributes to a denitration reaction, the flash point of the alcohol aqueous solution can be raised, and, in turn, the use of the low concentration of the alcohol aqueous solution, which is not required to be handled as a hazardous material, for example, in loading of the alcohol on a ship, does not lead to an increase of costs of denitration facilities.

Solution to Problem

For achieving the above object, the invention of claim 1 is directed to a method for purifying exhaust gas in which nitrogen oxides in exhaust gas are removed by bringing a combustion exhaust gas having an alcohol added as a reducing agent into contact with a denitration catalyst, characterized in that water vapor is further added to a raw exhaust gas to be processed, thereby increasing a water vapor concentration in the exhaust gas to give a moisture-adjusted exhaust gas, and the moisture-adjusted exhaust gas is introduced into a denitration catalyst layer.

The invention of claim 2 is directed to the method for purifying exhaust gas according to claim 1, characterized in that the water vapor concentration in the moisture-adjusted exhaust gas is 22.0% by volume or less in the total of the water vapor originally contained in the raw exhaust gas and the added water vapor.

The invention of claim 3 is directed to the method for purifying exhaust gas according to claim 1 or 2, characterized in that the addition of water vapor to the raw exhaust gas is performed by introducing liquid or gaseous water into the combustion exhaust gas.

The invention of claim 4 is directed to the method for purifying exhaust gas according to claim 1 or 2, characterized in that the addition of water vapor to the raw exhaust gas is performed by introducing an alcohol aqueous solution into the combustion exhaust gas.

The invention of claim 5 is directed to the method for purifying exhaust gas according to claim 4, characterized in that the alcohol is ethanol and a concentration of the ethanol aqueous solution introduced into the raw exhaust gas is 5.0% by volume or less.

The invention of claim 6 is directed to the method for purifying exhaust gas according to any one of claims 1 to 5, characterized in that the denitration catalyst is a denitration catalyst of cobalt supported on a ZSM-5 (MFI) type zeolite.

The invention of claim 7 is directed to the method for purifying exhaust gas according to any one of claims 1 to 6, characterized in that the exhaust gas is a combustion exhaust gas from a marine diesel engine.

Advantageous Effects of Invention

According to the method for purifying exhaust gas of the present invention, when an alcohol is used as a reducing agent, not only by using water vapor in the exhaust gas but also by further adding water vapor, an enhancement of the denitration performance can be expected and the durability of the denitration catalyst can be sufficiently enhanced, and by using an alcohol aqueous solution in a lowered concentration as a method for increasing the water content which contributes to a denitration reaction, the flash point of the alcohol aqueous solution can be raised and the hazard can be avoided, and, in turn, the use of the low concentration of the alcohol aqueous solution, which is not required to be handled as a hazardous material, for example, in loading of the alcohol on a ship, does not lead to an increase of costs of denitration facilities, thereby exhibiting an effect of an excellent practicability.

DESCRIPTION OF EMBODIMENTS

Figure 1:
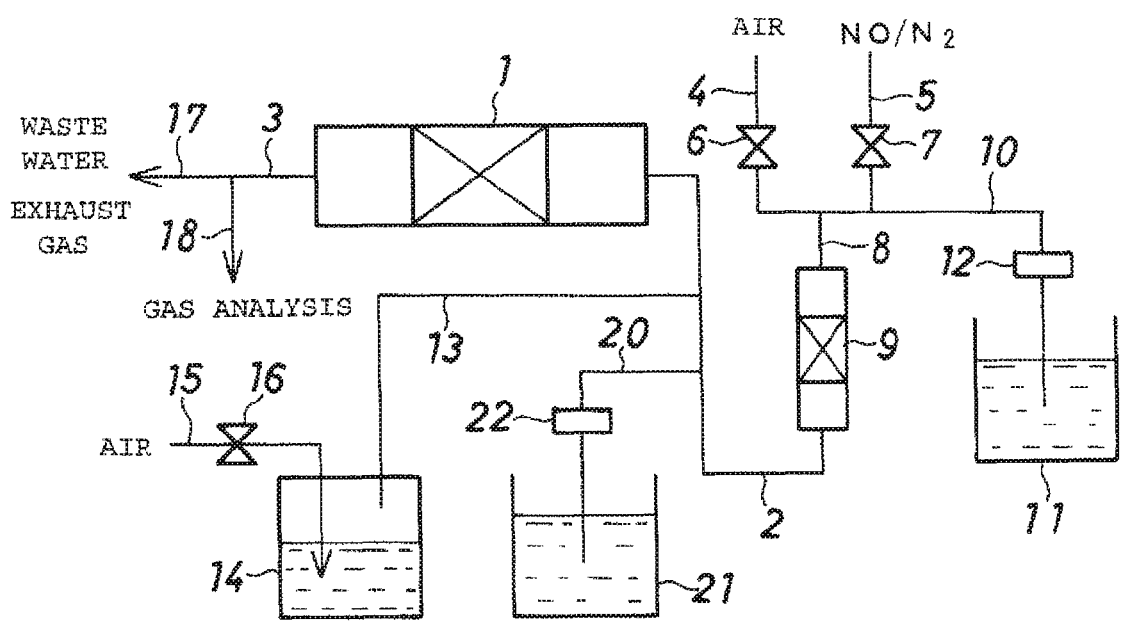
FIG. 1 is a flow chart showing an example of test equipment for use in a catalyst performance test in Examples 1 to 8 of the invention.

Next, the embodiments of the invention will be described, but the invention is not to be limited thereto.

The method for purifying exhaust gas of the invention is a method for purifying exhaust gas in which a combustion exhaust gas having an alcohol added as a reducing agent is brought into contact with a denitration catalyst, whereby nitrogen oxides in the exhaust gas are removed, the method being characterized in that water vapor is further added to a raw exhaust gas to be processed, thereby increasing a water vapor concentration in the exhaust gas to give a moisture-adjusted exhaust gas, and the moisture-adjusted exhaust gas is introduced into a denitration catalyst layer.

In the present invention, the water vapor concentration in the moisture-adjusted exhaust gas is preferably 22.0% by volume or less in the total of the water vapor originally contained in the raw exhaust gas and the added water vapor.

Here, an amount of water vapor in exhaust gas depends on the hydrogen content in and the oxygen consumption of the fuel. For example, an amount of water vapor in exhaust gas of an internal combustion engine such as a diesel engine, an oil burning boiler, and a gas turbine is about from 2 to 10% by volume.

On the other hand, when water vapor is added to combustion exhaust gas, it is possible that the combustion exhaust gas is cooled and to lower the temperature of the exhaust gas, and thus the water vapor in the exhaust gas is cooled to the dew point or lower. When the temperature of the combustion exhaust gas is lowered, the heat recovery will also be affected. In addition, when the temperature of the combustion exhaust gas is lowered, the temperature is possibly within a range where the activity of the denitration catalyst is lost.

Accordingly, in the present invention, the amount of water vapor to be added to the combustion exhaust gas is determined by taking into account the denitration performance, the combustion exhaust gas temperature, the energy recovery efficiency, and the like.

For example, the amount of water vapor added to combustion exhaust gas of an internal combustion engine such as a diesel engine, an oil burning boiler, and a gas turbine, is preferably set so that the water vapor concentration in the resulting moisture-adjusted exhaust gas is 22.0% by volume or less, preferably 2.5 to 22.0% by volume, and more preferably 5.0 to 22.0% by volume in the total of the water vapor originally contained in the raw exhaust gas and the added water vapor.

In the method for purifying exhaust gas according to the invention, the addition of water vapor to the raw exhaust gas is preferably performed by introducing liquid or gaseous water into the combustion exhaust gas.

Alternatively, in the method for purifying exhaust gas according to the invention, the addition of water vapor to the raw exhaust gas is preferably performed by introducing a liquid or gaseous alcohol aqueous solution into the combustion exhaust gas.

In the method for purifying exhaust gas according to the invention, the alcohol is preferably methanol, ethanol, and isopropyl alcohol, and especially preferably ethanol.

In the invention, it is preferred that the alcohol is ethanol and the concentration of the ethanol aqueous solution to be introduced into the raw exhaust gas is preferably such a concentration that the flash point is 60° C. or higher. That is, the concentration of ethanol in the ethanol aqueous solution is preferably 5.0% by volume or less, and more preferably 1.0 to 5.0% by volume.

In the method for purifying exhaust gas according to the invention, the denitration catalyst is preferably a denitration catalyst of cobalt supported on a ZSM-5(MFI) type zeolite.

In the method for purifying exhaust gas of the present invention, the exhaust gas is especially preferably combustion exhaust gas from a marine diesel engine.

Here, the amount of water vapor added to the combustion exhaust gas, for example, from a marine diesel engine is preferably such an amount that the water vapor concentration in the moisture-adjusted exhaust gas is 22.0% by volume or less in the total of the water vapor originally contained in the raw exhaust gas and the added water vapor. When the water vapor concentration in the moisture-adjusted exhaust gas exceeds 22.0% by volume in the total of the water vapor originally contained in the raw exhaust gas and the added water vapor, it is possible the combustion exhaust gas to be processed is cooled and the temperature of the combustion exhaust gas is lowered, and therefore the temperature of the water vapor in the combustion exhaust gas is cooled to the dew point or lower. When the temperature of the combustion exhaust gas is lowered, the heat recovery will also be affected. In addition, when the temperature of the combustion exhaust gas is lowered, the temperature is possibly within the range where the activity of the denitration catalyst is lost. Accordingly, such an amount is not preferable.

In the invention, when the denitration performance of the catalyst, the temperature of the combustion exhaust gas, and the energy recovery efficiency are taken into account, the amount of water vapor added to the combustion exhaust gas is preferably set so that the vapor water concentration in the moisture-adjusted exhaust gas is 22.0% by volume or less, and more preferably 2.5 to 22.0% by volume, in the total of the water vapor originally contained in the raw exhaust gas and the added water vapor.

According to the method for purifying exhaust gas of the present invention, when an alcohol is used as a reducing agent, not only by using water vapor in the exhaust gas but also by further adding water vapor, an enhancement of a denitration performance can be expected and durability of a denitration catalyst can be sufficiently enhanced.

In addition, by using an alcohol aqueous solution in a lowered concentration as a method for increasing the water content which contributes to a denitration reaction, the flash point of the alcohol aqueous solution can be raised and hazard can be avoided, and, in turn, the use of the low concentration of the alcohol aqueous solution, which is not required to be handled as a hazardous material, for example, in loading of the alcohol on a ship, does not lead to an increase of costs of denitration facilities, whereby the method is excellent in practicability

EXAMPLES

Hereinunder, effects of the method for purifying exhaust gas of the present invention are demonstrated with reference to Examples.

Example 1

A denitration test of exhaust gas was conducted using denitration test equipment having a configuration shown in FIG. 1. The procedure of the denitration test is as follows.

First, a denitration catalyst for use in the method for purifying exhaust gas of the invention was produced according to the following process.

(Preparation of Substrate)

A ZSM-5(MFI) type zeolite (HSZ-830NHA, manufactured by TOSOH CORPORATION), ion exchange water, and a silica sol [SILICADOL (registered tradename), manufactured by Nippon Chemical Industrial, Co., Ltd.] were mixed in a weight ratio of 100:100:46 to obtain a slurry.

Next, 20 g of the above slurry was uniformly spread over a sheet of glass paper (SPP-110, Oribest Co., Ltd.) cut into a size of 100 mm width×150 mm length, thereby allowing the slurry to be supported thereon.

The slurry-supporting glass paper sheet was then dried at a temperature of 110° C. for 1 hour, followed by baking at a temperature of 500° C. for 3 hours, whereby a flat plate substrate was obtained.

(Production of Catalyst)

The obtained flat plate substrate was immersed in 5 L of a 30 wt % cobalt nitrate solution heated to a temperature of 80° C. for 6 hours or more, and through ion exchange, a denitration catalyst of cobalt supported on a ZSM-5 (MFI) type zeolite was produced.

After the ion exchange, the catalyst was washed with 5 L of ion exchange water and then dried at 110° C. for 1 hour, whereby a denitration catalyst was obtained.

(Catalyst Performance Test)

As for the denitration catalyst obtained above, a denitration catalyst performance test for exhaust gas was conducted using the denitration test equipment the flow chart of which is shown in FIG. 1.

The flat plate denitration catalyst above was cut into test pieces having a size of 30 mm width×50 mm length, and 8 pieces thereof were used. The cut-out pieces of the flat plate denitration catalyst were disposed in a catalyst holder of stainless steel mesh (not shown) and placed in an alumina reacting tube (1).

Gas for the denitration test was introduced into the reacting tube (1) containing the denitration catalyst from one side through a line (2), and the gas after processing with the denitration catalyst was discharged from another side through a line (3).

The gas for the test introduced into the reacting tube (1) was prepared by mixing air from a line (4), $NO/N_2$ gas from a line (5), and water from a line (10), the water vapor concentration in the exhaust gas being set to 2.0% by volume with an assumption of combustion exhaust gas, for example, from a marine diesel engine.

Here, the air supply line (4) and the $NO/N_2$ supply line (5) were respectively provided with valves (6) and (7), and by controlling the opening of the valves (6) and (7) to control the flow rates of respective gas flows, the flow rates and the mixing ratio of the gas flows were controlled. On the other hand, water was introduced into the water supply line (10) by pumping a required amount of water from a raw water tank (11) with a metering pump (12).

The mixed raw exhaust gas with a water vapor concentration of 2.0% by volume simulating combustion exhaust gas of a diesel engine was introduced into the top of a distillation apparatus (9) through a raw exhaust gas supply line (8), taken out of the bottom of the distillation apparatus (9) through the line (2), and supplied to the reacting tube (1).

The method for purifying exhaust gas according to the invention is a method for purifying exhaust gas in which nitrogen oxides in combustion exhaust gas are removed by bringing combustion exhaust gas having ethanol added as a reducing agent into contact with a denitration catalyst in the reacting tube (1), wherein water vapor is further added to the raw exhaust gas to be processed via a line (20) to increase the water vapor concentration in the exhaust gas to 2.5% by volume, and the resulting moisture-adjusted exhaust gas is introduced into the reacting tube (1) including a denitration catalyst layer.

Here, as the water to be added to the exhaust gas before the reacting tube (1), a required amount of water is pumped from an added-water tank (21) with a metering pump (22), and through an added-water supply line (20), merged with the raw exhaust gas of the line (2). The water vapor concentration in the merged moisture-adjusted exhaust gas was made to 2.5% by volume in the total of the water vapor originally contained in the raw exhaust gas and the added water vapor, and the moisture-adjusted exhaust gas was then introduced into the reacting tube (1) including the denitration catalyst layer.

On the other hand, before the reacting tube (1) including the denitration catalyst layer, ethanol to be used as a reducing agent was supplied through a line (13). Here, as for the ethanol, air from a line (15) was fed to an ethanol reservoir tank (14), the ethanol along with air was supplied through the line (13) and then through the line (2) to the reacting tube (1). The air supply line (15) was provided with a valve (16), and by controlling the opening of the valve (16), the flow rate of the air was adjusted to adjust the amount of ethanol supplied. Incidentally, a heater (not shown) was provided in the course of the moisture-adjusted exhaust gas supply line (2), and by heating the heater, the added water introduced through the line (20) was vaporized.

The processed gas after denitration by being brought into contact with the denitration catalyst layer in the reacting tube (1) was discharged from the discharge line (3) through a line (17) to the exterior, and a part of the processed gas was taken via a line (18) and subjected to a gas analysis.

Test conditions in the catalyst performance test above were collectively shown in Table 1 below.

TABLE 1

Test conditions

| | |
|---|---|
| Gas composition: NO | 1000 ppmvd |
| Gas composition: Air | Balance |
| Ethanol | 1000 ppmvd |
| Water vapor concentration | 2.5% by volume |
| Gas flow rate | 2 L/min |
| Amount of catalyst | 8 Test pieces |
| Areal velocity | 5 Nm/h |
| Reaction temperature | 250° C. |

Here, the "Balance" in Table 1 refers to an amount to be added so as to make the gas composition 100% in total, meaning that the gas composition except for NO, ethanol and water is occupied by air (shown as Air in the table). The "areal velocity" was calculated with the following equation (I).

$$\text{Areal velocity} = (\text{Gas flow rate})/(\text{Catalyst geometric area}) \quad (I)$$

In the gas analysis of the processed gas exiting from the reacting tube (1) and taken out from the line (18), the NOx concentration at the outlet of the reacting tube (1) was measured using a NOx meter. From the measurement value of the NOx meter, the denitration rate which represents the NOx removal performance of the catalyst was calculated with the following equation (II).

$$\text{Denitration rate } (\%) = (NOx_{in} - NOx_{out})/NOx_{in} \times 100 \quad (II)$$

The obtained results of the denitration catalyst performance evaluation test are shown in Table 2 below.

Examples 2 to 8

In the same manner as in Example 1 described above, a denitration catalyst performance evaluation test corresponding to the method for purifying exhaust gas of the invention was conducted in almost the same conditions as the test conditions shown in Table 1 above. The tests in Examples 2 to 8 were different from that in Example 1 in that the amounts of pumping of the metering pump (22) from the added-water tank (21) were adjusted to add additional water vapor through the line (20) to the raw exhaust gas to be processed, a moisture-adjusted exhaust gas having sequentially increased water vapor concentrations of 4.9% by volume (Example 2), 8.6% by volume (Example 3), 10.1% by volume (Example 4), 11.0% by volume (Example 5), 14.0% by volume (Example 6), 19.1% by volume (Example 7), and 21.2% by volume (Example 8), in the total of the water vapor originally contained in the raw exhaust gas and the added water vapor was supplied to the reacting tube (1) including the denitration catalyst layer.

For each of Example 2 to 8, a gas analysis of the processed gas exiting from the reacting tube (1) was performed in the same manner as in Example 1, and the obtained results of the denitration catalyst performance evaluation test were collectively shown in Table 2 below.

Reference Example 1

For reference, a catalyst performance evaluation test was conducted in the same manner as in Example 1. The test was different from that in Example 1 described above in that the raw exhaust gas for the test introduced to the reacting tube (1) was prepared by mixing air from the line (4) and NO/N$_2$ gas from the line (5), and operations of both of the metering pump (12) of the raw water tank (11) and the metering pump (22) of the added-water tank (21) were stopped, and the raw exhaust gas with a water vapor concentration of 0% by volume was introduced into the reacting tube (1) including the denitration catalyst layer. A gas analysis of the processed gas exiting from the reacting tube (1) was performed in the same manner as in Example 1 described above, and the obtained results of the denitration catalyst performance evaluation test were collectively shown in Table 2 below.

Figure 2:
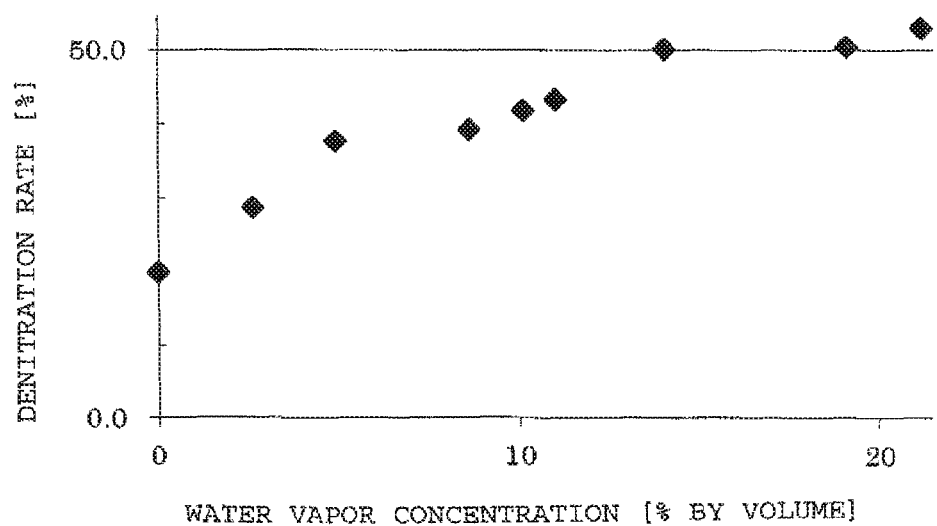
FIG. 2 is a graph showing a change in the denitration rate relative to the water vapor concentration in exhaust gas in Examples and the like of the invention.

FIG. 2 is a graph showing a change in the denitration rate relative to the water vapor concentration in the exhaust gas, which is a result of the denitration catalyst performance evaluation tests in Examples 1 to 8 according to the invention and Reference Example 1.

TABLE 2

| | Water vapor concentration in exhaust gas [% by volume] | Denitration rate [%] |
|---|---|---|
| Example 1 | 2.6 | 28.9 |
| Example 2 | 4.9 | 37.8 |
| Example 3 | 8.6 | 39.4 |
| Example 4 | 10.1 | 42.0 |
| Example 5 | 11.0 | 43.4 |
| Example 6 | 14.0 | 50.2 |
| Example 7 | 19.1 | 50.4 |
| Example 8 | 21.2 | 53.1 |
| Reference Example 1 | 0 | 19.8 |

As is apparent from the results shown in Table 2 above and FIG. 2, a high denitration rate was exhibited all in the denitration tests of Examples 1 to 8 according to the invention. In the denitration process of the exhaust gas in Reference Example 1 where the water vapor concentration was 0% by volume, the denitration rate was about 19.8%. In contrast, in the examples of Examples 1 to 8 according to the invention, in the denitration tests in which the water vapor concentrations in the moisture-adjusted exhaust gas were 2.5 to 21.2% by volume in the total of the water vapor originally contained in the raw exhaust gas and the added water vapor, the denitration rate was increased as the water vapor concentration in the exhaust gas increased. From the result, it has been found that the denitration performance is enhanced by further adding water to the water vapor in the raw exhaust gas.

As can be seen from the above, according to the method for purifying combustion exhaust gas of the invention, when ethanol was used as a reducing agent, not only by using water contained in the raw exhaust gas but also by further adding water, an enhancement of a denitration performance could be expected and durability of a denitration catalyst could be sufficiently enhanced.

Example 9

In the same manner as in Example 1 described above, a denitration catalyst performance evaluation test corresponding to the method for purifying exhaust gas of the invention was conducted in almost the same conditions as the test conditions shown in Table 1 above. The test was different from that in the Example 1 described above in that in Example 1, the addition of water vapor to the raw exhaust gas is performed by introducing liquid or gaseous water into the combustion exhaust gas, whereas in Example 9, the addition of water vapor to the raw exhaust gas was performed by introducing an ethanol aqueous solution into the combustion exhaust gas. For such a process, a denitration catalyst performance test for exhaust gas was conducted using the denitration test equipment the flow chart of which is shown in FIG. 3.

As ethanol used as a reducing agent, an ethanol aqueous solution having a concentration of 1.26% by volume was prepared in advance, and the ethanol aqueous solution was stocked in a reservoir tank (24). A requires amount of the ethanol aqueous solution was pumped from the ethanol aqueous solution reservoir tank (24) with a metering pump (25), and through a line (26), merged with raw exhaust gas of a line (2) simulating combustion exhaust gas of a diesel engine. The water vapor concentration in the merged moisture-adjusted exhaust gas was made to 21.2% by volume (the same as in Example 8) in the total of the water vapor originally contained in the raw exhaust gas and the added water vapor, and then the moisture-adjusted exhaust gas was introduced into a reacting tube (1) including a denitration catalyst layer. Incidentally, a heater (not shown) was provided in the course of the moisture-adjusted exhaust gas supply line (2), and by heating the heater, the added ethanol aqueous solution introduced through the line (26) was vaporized.

The processed gas after denitration by being brought into contact with the denitration catalyst layer in the reacting tube (1) was discharged through a discharge line (3) and then through a line (17) to the exterior and apart of the processed gas was taken via a line (18) and subjected to a gas analysis, in the same manner as in the Example 1 described above. The obtained results of the denitration catalyst performance evaluation test are shown in Table 3 below.

Figure 3:
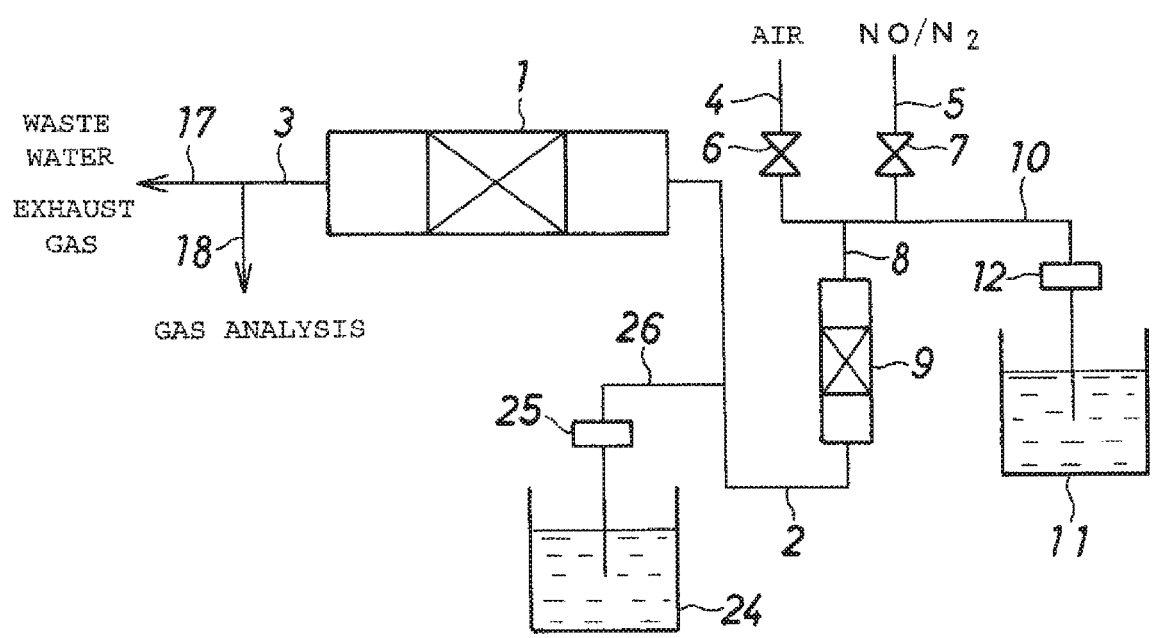
FIG. 3 is a flow chart showing another example of test equipment for use in a catalytic performance test in Example 9 of the invention.

Incidentally, since the other points than the above in Example 9 of the invention are the same as in Example 1 above, in FIG. 3, the same parts as in FIG. 1 above are given the same reference numerals and signs.

TABLE 3

| | Concentration of ethanol aqueous solution [% by volume] | Water vapor concentration in exhaust gas [% by volume] | Denitration rate [%] |
|---|---|---|---|
| Example 9 | 1.26 | 21.2 | 53.1 |

As is apparent from the results in Table 3 above, the denitration rate in the denitration test in Example 9 according to the invention was 53.1%, and a high denitration rate was shown.

As can be seen from the above, according to the method for purifying combustion exhaust gas of the invention, when ethanol was used as a reducing agent, not only by using water contained in the raw exhaust gas but also by further adding water, an enhancement of a denitration performance could be expected and durability of a denitration catalyst could be sufficiently enhanced.

In addition, by using an ethanol aqueous solution in a lowered concentration as a method for increasing the water content which contributes to a denitration reaction, the flash point of the ethanol aqueous solution can be raised, and, in turn, the use of the low concentration of the ethanol aqueous solution, which is not required to be handled as a hazardous material, for example, in loading of the alcohol on a ship, does not lead to an increase of costs of denitration facilities, whereby the method is excellent in practicability.

REFERENCE SIGNS LIST

1: Reaction tube including denitration catalyst layer
2: Exhaust gas supply line
3: Processed gas discharge line
4: Air supply line
5: NO/$N_2$ gas supply line
6: Valve
7: Valve
8: Raw exhaust gas supply line
9: Distillation apparatus
10: Water supply line
11: Raw water tank
12: Metering pump
13: Ethanol supply line
14: Ethanol reservoir tank
15: Air supply line
16: Valve
17: Processed gas discharge line
18: Processed gas partially taking line
20: Added-water supply line
21: Added-water tank
22: Metering pump
24: Ethanol aqueous solution reservoir tank
25: Metering pump
26: Ethanol aqueous solution supply line

The invention claimed is:

1. A method for purifying exhaust gas in which nitrogen oxides in exhaust gas is removed by bringing a combustion exhaust gas having an alcohol added as a reducing agent into contact with a denitration catalyst, wherein water vapor is further added to a raw exhaust gas to be processed, thereby increasing a water vapor concentration in the exhaust gas to give a moisture-adjusted exhaust gas, and the moisture-adjusted exhaust gas is introduced into a denitration catalyst layer, wherein the denitration catalyst is a denitration catalyst of cobalt supported on a ZSM-5 (MFI) type zeolite.

2. The method for purifying exhaust gas according to claim 1, wherein the water vapor concentration in the moisture-adjusted exhaust gas is 22.0% by volume or less in the total of the water vapor originally contained in the raw exhaust gas and the added water vapor.

3. The method for purifying exhaust gas according to claim 2, wherein the addition of water vapor to the raw exhaust gas is performed by introducing liquid or gaseous water into the combustion exhaust gas.

4. The method for purifying exhaust gas according to claim 2, wherein the addition of water vapor to the raw exhaust gas is performed by introducing an alcohol aqueous solution into the combustion exhaust gas.

5. The method for purifying exhaust gas according to claim 4, wherein the alcohol is ethanol, and a concentration of the ethanol aqueous solution introduced into the raw exhaust gas is 5.0% by volume or less.

6. The method for purifying exhaust gas according to claim 2, wherein the exhaust gas is a combustion exhaust gas from a marine diesel engine.

7. The method for purifying exhaust gas according to claim 1, wherein the addition of water vapor to the raw exhaust gas is performed by introducing liquid or gaseous water into the combustion exhaust gas.

8. The method for purifying exhaust gas according to claim 7, wherein the exhaust gas is a combustion exhaust gas from a marine diesel engine.

9. The method for purifying exhaust gas according to claim 1, wherein the addition of water vapor to the raw exhaust gas is performed by introducing an alcohol aqueous solution into the combustion exhaust gas.

10. The method for purifying exhaust gas according to claim 9, wherein the alcohol is ethanol, and a concentration of the ethanol aqueous solution introduced into the raw exhaust gas is 5.0% by volume or less.

11. The method for purifying exhaust gas according to claim 10, wherein the exhaust gas is a combustion exhaust gas from a marine diesel engine.

12. The method for purifying exhaust gas according to claim 9, wherein the exhaust gas is a combustion exhaust gas from a marine diesel engine.

13. The method for purifying exhaust gas according to claim 1, wherein the exhaust gas is a combustion exhaust gas from a marine diesel engine.

* * * * *